(No Model.)

R. FOSTER.
TRANSPLANTING IMPLEMENT.

No. 409,949. Patented Aug. 27, 1889.

Witnesses
Chas Stebbins
H. Wiser Fairchild

Inventor:
Richard Foster

UNITED STATES PATENT OFFICE.

RICHARD FOSTER, OF CAZENOVIA, NEW YORK.

TRANSPLANTING IMPLEMENT.

SPECIFICATION forming part of Letters Patent No. 409,949, dated August 27, 1889.

Application filed March 16, 1889. Serial No. 303,621. (No model.)

*To all whom it may concern:*

Be it known that I, RICHARD FOSTER, a citizen of Great Britain, having declared my intention of becoming a citizen of the United States, residing at Cazenovia, in the county of Madison and State of New York, have invented a new and useful Machine for Transplanting Plants, Planting Bulbs, Grain, and Seeds, and for Digging Post-Holes, of which the following is a specification.

My invention relates to an improvement in transplanting implements; and the object of my invention is to produce an implement consisting of two pivoted spring-actuated trowels adapted to be opened by hand or foot and closed by the action of a spring, and which is especially adapted for transplanting plants, planting bulbs and seeds of all kinds, and which is also adapted for digging post-holes, and of which the following is a description.

Figure 1:
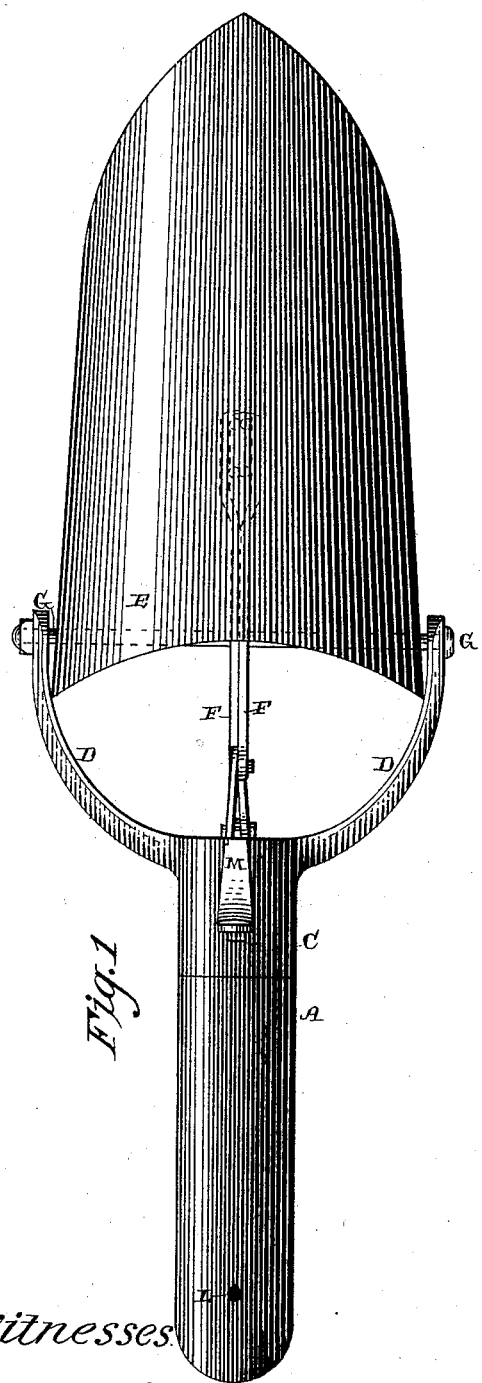
Figure 2:
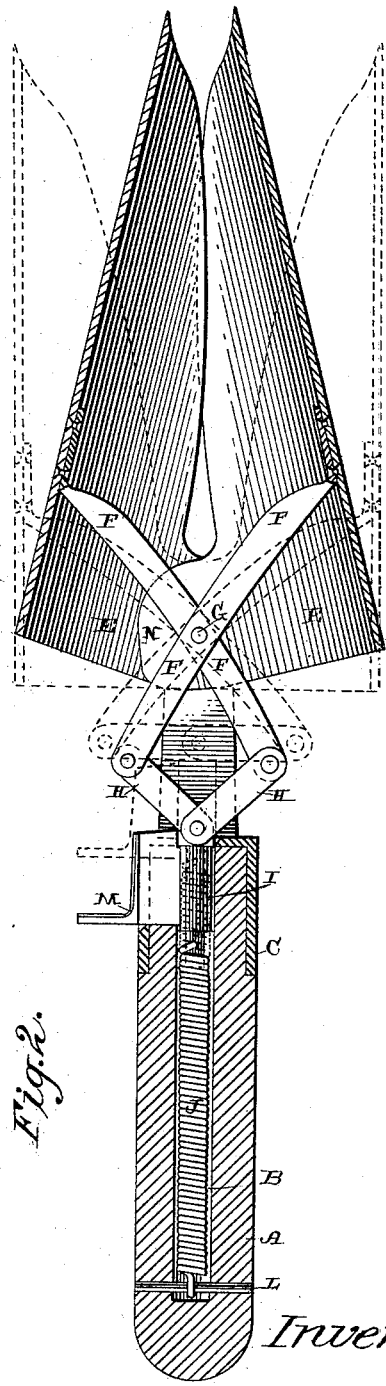

Figure 1 is a side elevation of an implement embodying my invention. Fig. 2 is a vertical section thereof, taken at right angles to Fig. 1.

A indicates the handle, which is provided with a longitudinal aperture of any suitable length, and is provided at its lower end with a metallic or other suitable ferrule C. Extending downward from the ferrule and suitably curved, as shown, so as to form a U, are the supporting-arms D, between which the trowels E are pivoted. Passing through the lower ends of these arms D, through the inwardly-extending portion N of the trowels at their upper ends, and through the arms F near their centers, is the shaft G. By this construction the trowels are provided with a support at their upper sides, thus not placing the whole of the strain upon the upper ends of the arms F, and which makes a very desirable and strong construction. Were it not for this construction, the whole of the strain placed upon the trowels when forcing them into the ground would be upon the arms F at their point of attachment to the trowels, which would either result in wrenching or breaking out of the trowels at that point or a breaking of the arms themselves. The lower ends of the arms F are rigidly secured to the trowels in any suitable manner, and are crossed at the center, as shown. Loosely connected to the upper ends of these arms are the links H, which extend upward and inward and have their upper ends pivoted in the lower end of the sliding rod I. Placed within the longitudinal aperture B is a spring J, of suitable length and strength, the lower end of which is connected to the rod I and its upper end fastened to the pin L, passing transversely through the handle near the upper end of said aperture. The tension of the spring is upward, thus holding the trowels E in the position shown in solid lines. M indicates an operating-handle, by means of which the rod I is pushed downward, forcing the lower ends of the links H and the upper ends of the arms F outward, thus throwing their lower ends outward, carrying with them the trowels, as shown in dotted lines.

While the invention is here shown as a trowel for transplanting purposes, it may be used as an ordinary trowel by locking the trowels open in the position shown in dotted lines, or as a post-hole digger by lengthening the handle. It will be seen that after the trowels have been opened and forced into the ground the tension of the spring automatically closes them, holding the dirt between them. When it is being used as a post-hole digger, in which case the handle is lengthened, the operating-handle M will be operated by foot for forcing the trowels open.

Having thus described my invention, I claim—

1. The combination of the handle having a longitudinal recess, the downwardly-extending and outwardly-curved supporting-arms, the trowels having their upper ends extending between the ends of said arms, the crossed operating-arms having their lower ends connected to the trowels, the shaft passing through the crossed arms near their centers, the upper ends of the trowels and the supporting-arms, the connecting-links, the spring, and the rod connecting the links and the spring, substantially as shown.

2. The combination of the handle having a longitudinal aperture, the spring placed therein, the sliding rod, the operating-handle connected thereto, the arms crossed at their center and having their lower ends connected to the trowels, the connecting-links, the supporting-arms extending downward and curved outward from the lower end of the handle, and the shaft passing through the trowels, the operating-arms at their point of intersection, and the supporting-arms, substantially as described.

RICHARD FOSTER.

Witnesses:
SIDNEY T. FAIRCHILD,
L. FAIRCHILD.